United States Patent [19]
Honda

[11] Patent Number: 5,421,775
[45] Date of Patent: Jun. 6, 1995

[54] COMPARTMENT VENTILATING APPARATUS

[75] Inventor: Kouichi Honda, Tokyo, Japan

[73] Assignee: Takigen Manufacturing Co. Ltd., Tokyo, Japan

[21] Appl. No.: 197,064

[22] Filed: Feb. 16, 1994

[30] Foreign Application Priority Data

Mar. 31, 1993 [JP] Japan .................. 5-096905

[51] Int. Cl.⁶ ............................................. F24F 13/18
[52] U.S. Cl. ........................................ 454/274; 62/410; 454/195; 454/277; 454/283
[58] Field of Search ............. 62/409, 410; 454/195, 454/274, 277, 283

[56]  References Cited
U.S. PATENT DOCUMENTS

| | | | |
|---|---|---|---|
| 2,798,422 | 7/1957 | Bourque | 454/195 |
| 2,820,475 | 1/1958 | Hobbs | 454/195 X |
| 3,813,896 | 6/1974 | Lebahn | 454/195 X |
| 3,952,542 | 4/1976 | Berkowitz | 454/195 X |

Primary Examiner—Harold Joyce
Attorney, Agent, or Firm—Martin Smolowitz

[57] ABSTRACT

A compartment ventilating apparatus prevents its indoor louver (22) from being subjected to the formation of dew, and, therefore can prevent the dew built up in its ventilation area in the form of ice, which enables the apparatus to keep a sufficient ventilation area in operation. In the apparatus, an opening portion (3) passes through a side wall (2) of a compartment (1). Mounted in the opening portion, (3) are an inner ventilation unit (4) and an outer ventilation unit (5) which is spaced apart from the inner ventilation unit (4).

8 Claims, 3 Drawing Sheets

COMPARTMENT VENTILATING APPARATUS

BACKGROUND OF THE INVENTION

1. Field of the Invention

The present invention relates to a compartment ventilating apparatus which is installed in side walls of refrigerators, freezing chambers, cold storages and the like to discharge indoor air when a door is closed and to take in outdoor air when the door is opened, so as to facilitate the opening/closing operation of the door, whereby a rapid increase of an indoor air pressure is prevented while the thus taken in outdoor air facilitates the door's opening operation.

2. Description of the Prior Art

In a conventional compartment ventilating apparatus, a ventilation unit is installed in a through-hole or opening portion of a side wall of a compartment. The ventilation unit comprises: a casing mounted in the opening portion of the side wall in an insertion manner; a partition element mounted in the casing in an insertion manner to partition the interior of the casing into an inner air space and an outer air space; a first closing plate disposed outside the partition element so as to open and close a first ventilation hole; a second closing plate disposed inside the partition element so as to open and close a second ventilation hole; a guide shaft slidably mounted in each of an axial hole of a central portion of the partition element, an axial hole of a central portion of the first closing plate and an axial hole of a central portion of the second closing plate; a stopper portion formed in one of opposite ends of the guide shaft so as to abut against the first closing plate or the second closing plate; a seat plate having its axial hole slidably receive a threaded rod portion of the other of the opposite ends of the guide shaft; a nut threadably engaged with the threaded rod portion of the guide shaft to support the seat plate; and, a compression spring interposed between the first closing plate or the second closing plate and the seat plate to have the first closing plate and the second closing plate abut against an inner surface and an outer surface of the partition element. The opening portion of the side wall of the compartment has its opposite ends covered with louvers and insect nets. The louvers comprise an indoor louver and an outdoor louver.

However, in the conventional compartment ventilating apparatus having the above construction, since only one ventilation unit is employed in the compartment to separate the indoor air from the outdoor air therein, the indoor louver is often subjected to the formation of dew when a difference in temperature between the indoor air and the outdoor air is large. The thus formed dew or frost, is built up in the ventilation area of the convention unit in the form of ice to decrease the ventilation area in cross section, which impairs the conventional unit in pressure-regulating properties.

Further, in the conventional compartment ventilating apparatus, since the only one guide shaft slidably passes through the partition element and the circular axial holes of the central portions of the first and the second closing plate, the first and the second closing plate often vibrates in operation to frequently catch an inner surface of the casing, which causes a malfunction of the conventional unit.

SUMMARY OF THE INVENTION

It is an object of the present invention to provide a compartment ventilating apparatus which prevents the formation of dew in its indoor louver, and, therefore prevents the built up of the thus formed dew in its ventilation area in the form of ice so as to prevent the ventilation area from decreasing in cross section, and facilitates a smooth operation of the first and the second closing plate.

According to a first aspect of the present invention, the above object of the present invention is accomplished by providing:

a compartment ventilating apparatus comprising:
- an opening portion passing through a side wall of a compartment to open both inside and outside the compartment;
- an inner ventilation unit mounted in the opening portion; and
- an outer ventilation unit mounted in the opening portion, the outer ventilation unit being spaced apart from the inner ventilation unit in the opening portion.

According to a second aspect of the present invention, the above object of the present invention is accomplished by providing:

the compartment ventilation apparatus as set forth in the first aspect of the present invention, wherein the inner ventilation unit and the outer ventilation unit comprise:
- a casing mounted in the opening portion of the side wall in an insertion manner;
- a pair of partition elements each of which is mounted in the casing to partition the interior of the casing into an inner air space and an outer air space;
- a first closing plate which is disposed outside each of the partition elements to open and close a first ventilation hole;
- a second closing plate which is disposed inside each of the partition elements to open and close a second ventilation hole;
- a pair of guide shafts which pass through a pair of axial holes of a central portion of each of the partition elements, a pair of axial holes of a central portion of the first closing plate and a pair of axial holes of a central portion of the second closing plate, and are slidably mounted in the axial holes;
- a stopper portion formed in one of opposite ends of each of the guide shafts, one of the stopper portions abutting against the first closing plate while the other of the stopper portions abuts against the second closing plate;
- a pair of seat plates each of which is provided with a pair of axial holes in which a pair of threaded rod portions of the guide shafts are slidably received;
- a pair of nuts each of which is threadably engaged with each of the threaded rod portions of the guide shafts to support the seat plate; and
- a pair of biasing springs, one of which is interposed between the first closing plate and one of the seat plates, and the other of which biasing springs being interposed between the second closing plate and the other of the seat plates, the one of the biasing springs having the first closing plate abut against an inner surface of the one of the partition elements while the other of the biasing springs has the second closing plate abut against an outer surface of the other of the partition elements.

DESCRIPTION OF THE PREFERRED EMBODIMENTS

Figure 1:
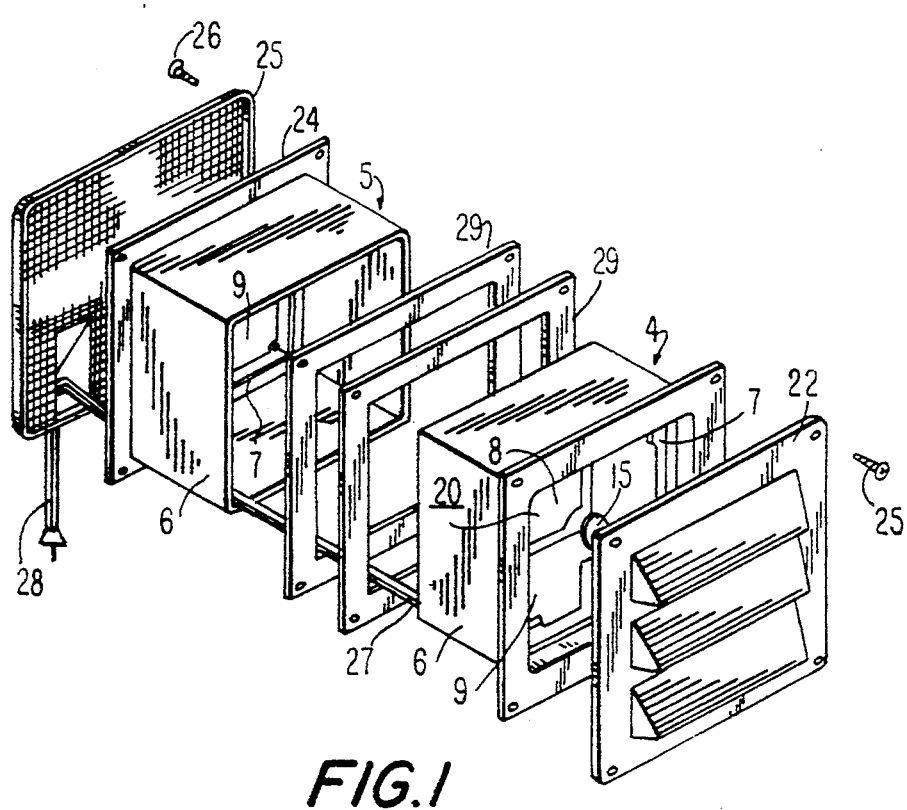
FIG. 1 is a perspective exploded view of an embodiment of the compartment ventilating apparatus of the present invention.
Figure 2:
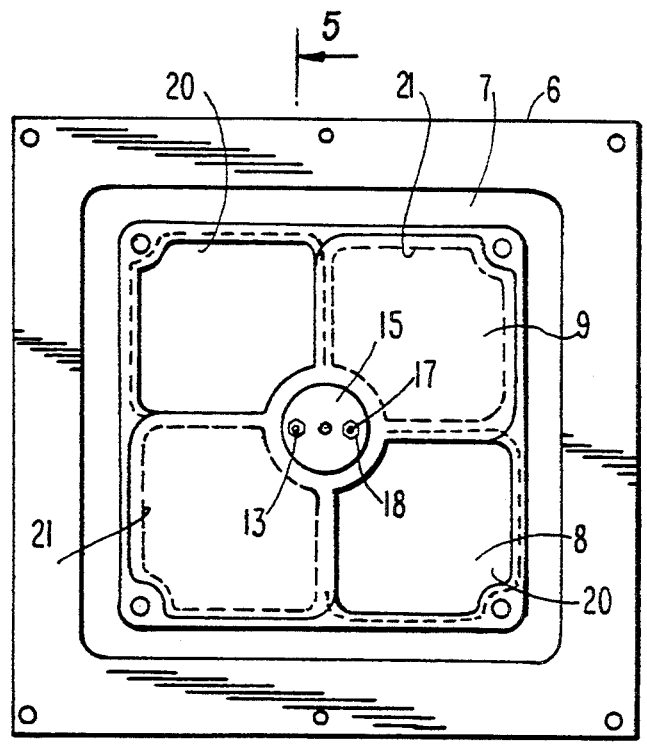
FIG. 2 is a front view of the compartment ventilating apparatus of the present invention shown in FIG. 1 from inside the compartment.
Figure 3:
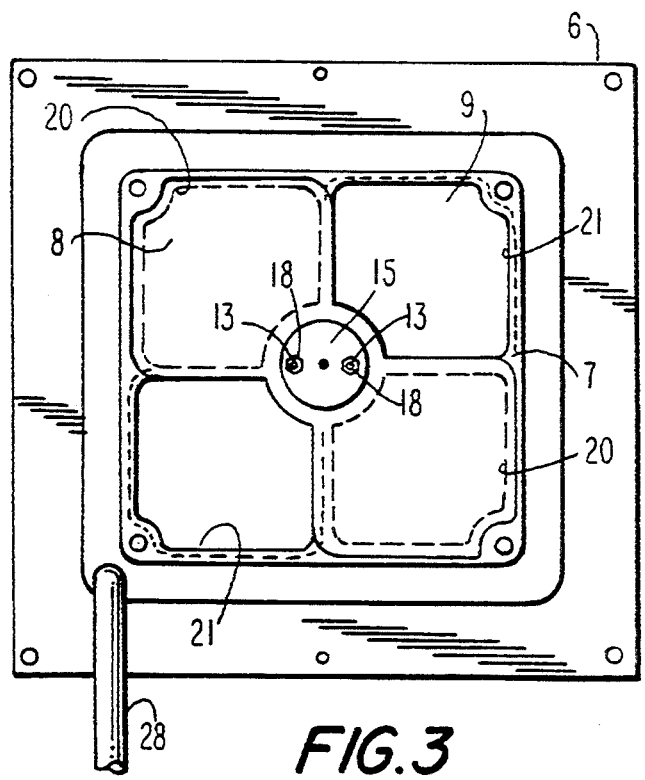
FIG. 3 is a rear view of the compartment ventilating apparatus of the present invention shown in FIG. 1 from outside the compartment.
Figure 4:
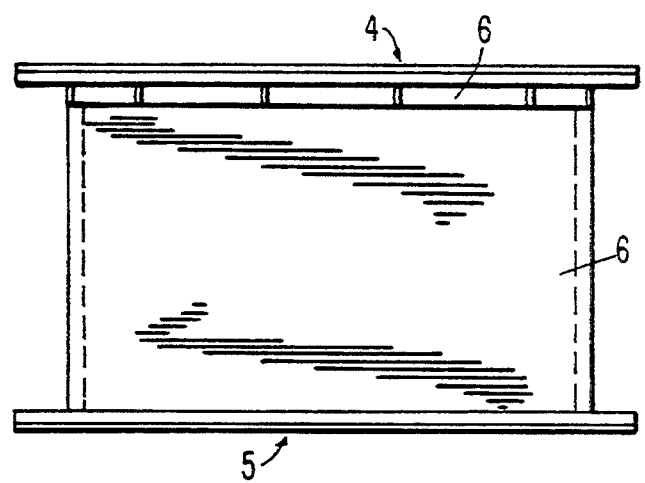
FIG. 4 is a plan view of the compartment ventilating apparatus of the present invention shown in FIG. 1.
Figure 5:
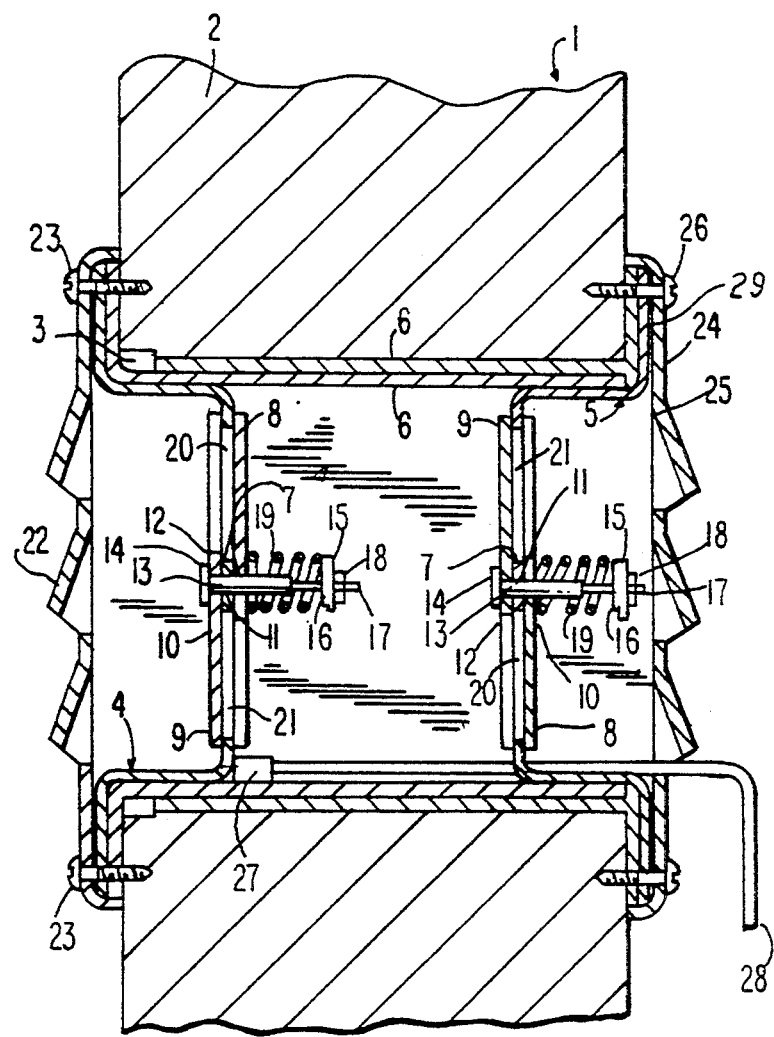
FIG. 5 is a longitudinal sectional view of the compartment ventilating apparatus of the present invention installed in the compartment, taken along the line 5—5 of FIG. 2.

Hereinbelow, the present invention will be described in detail with reference to the accompanying drawings and the reference numerals and characters.

A compartment ventilating apparatus of the present invention comprises: an opening portion 3 which passes through a side wall 2 of a compartment 1 to open both inside and outside the compartment 1; an inner ventilation unit 4 mounted in the opening portion 3; and an outer ventilation unit 5 mounted in the opening portion 3, the outer ventilation unit 5 being spaced apart from the inner ventilation unit 4 in the opening portion 3.

In the compartment ventilating apparatus of the present invention having the above construction, the inner ventilation unit 4 and the outer ventilation unit 5 comprise: a casing 6 mounted in the opening portion 3 of the side wall 2 in an insertion manner; a pair of partition elements 7 each of which is mounted in the casing 6 to partition the interior of the casing 6 into an inner air space and an outer air space; a first closing plate 8 which is disposed outside each one of the partition elements 7 to open and close a first ventilation hole 20 provided in the partition element 7; a second closing plate 9 which is disposed inside each of the partition elements 7 to open and close a second ventilation hole 21 provided in the partition element 7; a pair of guide shafts 13 which pass through a pair of axial holes 10 of a central portion of each of the partition elements 7, a pair of axial holes 11 of a central portion of the first closing plate 8 and a pair of axial holes 12 of a central portion of the second closing plate 9, and are slidably mounted in the axial holes 10, 11 and 12; a stopper portion 14 formed in one of opposite ends of each of the guide shafts 8, one of the stopper portions 14 abutting against the first closing plate 8 while the other of the stopper portions 14 abuts against the second closing plate 9; a pair of seat plates 15 each of which is provided with a pair of axial holes 16 in which a pair of threaded rod portions 17 of the guide shafts 13 are slidably received; a pair of nuts 18 each of which is threadably engaged with each of the threaded rod portions 17 of the guide shafts 13 to support the seat plate 15; and a pair of biasing springs 19, one of which pair of biasing springs is interposed between the first closing plate 8 and one of the seat plates 15, and the other of which pair of biasing springs 19 being interposed between the second closing plate 9 and the other of the seat plates 15, the one pair of the biasing springs 19 having the first closing plate 8 abut against an inner surface of the one of the partition elements 17 while the other pair of the biasing springs 19 has the second closing plate 9 abut against an outer surface of the other of the partition elements 17.

In operation, when the indoor air pressure of the compartment 1 is increased upon a closing operation of the compartment door, the second closing plate 9 is abutted against the inner surface of the partition element 7 in each of the inner ventilation unit 4 and the outer ventilation unit 5, in each of the inner ventilation unit 4 and the outer ventilation unit 5, so that the second ventilation hole 21 is held in its closing position. On the other hand, the first closing plate 8 is separated from the partition element 7 in each of the inner ventilation unit 4 and the outer ventilation unit 5 against a resilient force exerted by the compression biasing spring 19, in each of the inner ventilation unit 4 and the outer ventilation unit 5, so that the first ventilation hole 20 is opened to permit a part of the pair of indoor air to be discharged outward through the first ventilation hole 20, whereby the indoor air pressure decreases. At this time, the guide shafts 13 remain motionless, and only the first closing plate 8 is moved along the guide shafts 13.

When the indoor air balances in pressure with the outdoor air, the first closing plate 8 is returned to a position in which the first closing plate 8 abuts against the partition element 7 under the influence of the resilient force exerted by the pair of compression biasing springs 19, so that both of the first closing plate 8 and the second closing plate 9 of the partition elements 7 are closed.

When a negative air pressure is produced inside the compartment 1 upon an opening operation of the door, the first closing plate 8 is abutted against the partition element 7 in each of the inner ventilation unit 4 and the outer ventilation unit 5, so that the first ventilation hole 20 remains closed while the second ventilation hole 21 is opened since the second closing plate 9 is separated from the corresponding partition element 7. Consequently, the outdoor air enters the compartment 1 through the thus opened second ventilation hole 21. At this time, since the stopper portion 14 of the guide shaft 13 is pushed by the corresponding second closing plate 9, the guide shaft 13 is moved together with the second closing plate 9 so that the pair of compression biasing springs 19 is compressed by the seat plate 15.

When the compartment indoor air balances in pressure with the outdoor air, the second closing plate 9 returns to a position in which the second closing plate 9 abuts against the partition element 7 under the influence of the pair of resilient force exerted by the compression biasing springs 19, so that the guide shaft 13 also returns to its initial position, whereby both of the first ventilation hole 20 and the second ventilation hole 21 of the partition elements 7 are closed together.

In the embodiment of the present invention shown in the drawings, the square-sleeve type casing 6 of the inner ventilation unit 4 is mounted in the square-sleeve shape type outer ventilation unit 5 in an insertion manner. A flange portion of the partition element 7 of the inner ventilation unit 4 and a corresponding flange portion of the casing 6 overlap each other, and are fixedly mounted on the inner surface of the side wall 2 of the compartment 1 together with the indoor louver 22 and a water-tight packing 29 through screws 23. A flange portion of the partition element 7 of the outer ventilation unit 5 and a corresponding flange portion of the casing 6 overlap each other, and are fixedly mounted on the outer surface of the side wall 2 of the compartment 1 together with the outdoor louver 24, the insect net or screen 25 and a water-tight packing 29 through screws 26.

In order to prevent the dew from being formed in the first closing plate 8 and the second closing plate 9 and forming ice thereon so as to have these plates 8, 9 stick to the corresponding partition elements 7, the inner ventilation unit 4 is provided with an electric heater 27 which has its power cord 28 extend outward from the compartment 1. In each of the inner ventilation unit 4 and the outer ventilation unit 5, a main part of the partition element 7 assumes a square shape, so that each pair of the first ventilation hole 20 and the second ventilation hole 21 are disposed on each of diagonal lines of the square shape. The guide shafts 13 are inserted into the partition elements 7 from a side of the second closing plate 9. It is possible to adjust an initial resilient force of the compression biasing springs 19 by moving the nut 18 back and forth along the guide shaft 13, which permits the user to adjust the apparatus of the present invention in its operation pressure.

As described above, in the compartment ventilating apparatus of the present invention: the inner ventilation unit 4 is mounted in the opening portion 3; and, an outer ventilation unit 5 is mounted in the opening portion 3 and spaced apart from the inner ventilation unit 4 in the opening portion 3; and, an air space defined between these units 4 and 5 serves as a heat insulation layer to reduce a difference in temperature between the inner ventilation unit 4 and the interior of the compartment 1, so that the formation of dew in the indoor louver 22 is considerably reduced, which prevents the built up of ice in the ventilation area of the apparatus of the present invention, and, therefore improves the apparatus in ventilation capacity.

Further, in the compartment ventilating apparatus of the present invention, in each of the inner ventilation unit 4 and the outer ventilation unit 5 thereof, the pair of the guide shafts 13 pass through the pair of axial holes 10 of the central portion of each of the partition elements 7, the pair of axial holes 11 of the central portion of the first closing plate 8 and the pair of axial holes 12 of the central portion of the second closing plate 9. Consequently, there is no fear that the first closing plate 8 and the second closing plate 9 catch the inner surface of the casing 6 to cause the malfunction of the apparatus of the present invention.

Furthermore, in the compartment ventilating apparatus of the present invention, each of the first closing plate 8 and the second closing plate 9 may accurately operate in response to variations in air pressure in a smooth manner.

What is claimed is:

1. A compartment ventilating apparatus adapted for being mounted in a side wall of a compartment, said apparatus comprising:
   an opening portion (3) passing through a side wall (2) of the compartment (1) to open inside and outside the compartment;
   an inner ventilation unit (4) mounted in said opening portion (3); and
   an outer ventilation unit (5) mounted in said opening portion (3), said outer ventilation unit (5) being spaced apart from said inner ventilation unit (4) in said opening portion (3);
   wherein a casing (6) is mounted in said opening portion (3) of said side wall (2) in an insertion manner;
   a pair of partition elements (7) each of which is mounted in said casing (6) to partition the interior of said casing (6) into an inner air space and an outer air space, each said partition element (7) containing a first ventilation hole (20) and a second ventilation hole (21);
   a first closing plate (8) which is disposed outside each of said partition elements (7) to open and close said first ventilation hole (20) therein;
   a second closing plate (9) which is disposed inside each of said partition elements (7) to open and close said second ventilation hole (21) therein;
   a pair of guide shafts (13) which pass through a pair of axial holes (10) of a central portion of each of said partition elements (7), a pair of axial holes (11) of a central portion of said first closing plate 8 and a pair of axial holes (12) of a central portion of said second closing plate (9), each said guide shaft (13) being slidably mounted in said axial holes (10), (11) and (12);
   a stopper portion (14) formed in one of opposite ends of each of said guide shafts (13), one of said stopper portions (14) abutting against said first closing plate (8) while the other of said stopper portions (14) abuts against said second closing plate (9);
   a pair of seat plates (15) each of which is provided with a pair of axial holes (16) in which a pair of threaded rod portions (17) of said guide shafts (13) are slidably received;
   a pair of nuts (18) each of which is threadably engaged with each of said threaded rod portions (17) of said guide shafts (13) to support said seat plates (15); and
   a pair of biasing springs (19), one of which biasing springs is interposed between said first closing plate (8) and one of said seat plates (15), and the other of which biasing springs (19) being interposed between said second closing plate (9) and the other of said seat plates (15), said one of said biasing springs (19) having said first closing plate (8) abut against an inner surface of said one of said partition elements (17) while the other of said biasing spring (19) has said second closing plate (9) abut against an outer surface of the other of said partition elements (17).

2. The compartment ventilating apparatus according to claim 1, wherein said partition element (7) in said inner ventilation unit (4) and said outer ventilation unit (5) has a square shape.

3. The compartment ventilating apparatus according to claim 1, wherein an indoor louver (22) is fixedly mounted on a flange portion of said inner ventilation unit (4), and an outdoor louver (24) is fixedly mounted in a flange portion of said outer ventilation unit (5).

4. The compartment ventilating unit according to claim 3, wherein a screen element (25) is provided between said outdoor louver (24) and the flange portion of said outer ventilation unit (5).

5. The compartment ventilating unit according to claim 1, wherein said inner ventilation unit (4) is provided with an electric heater (27) to prevent ice formation on said first closing plate (8) and said second closing plate (9) of the inner ventilation unit.

6. The compartment ventilating unit according to claim 1, wherein said casing (6) includes two sleeve type portions and two outer flange portions, so that the sleeve-type portion of said inner ventilation unit (4) is inserted inside the sleeve-type portion of said outer ventilation unit (5).

7. The compartment ventilating unit according to claim 1, wherein said partition element (7) includes a flange portion which overlaps a flange portion of said casing (6).

8. The compartment ventilating unit of claim 3, wherein a water-tight packing (29) is provided between said outdoor lower (24) and the flange portion of said outer ventilating unit (5).

* * * * *